May 16, 1967  J. L. AMMONS ETAL  3,319,286
METHOD OF MOLDING SKINLESS SAUSAGE
Filed March 17, 1965  9 Sheets-Sheet 1

Fig. 1

JOSEPH L. AMMONS
FLOYD H. MORROW
INVENTORS

BY Wayland D. Keith
THEIR AGENT

United States Patent Office 3,319,286
Patented May 16, 1967

3,319,286
METHOD OF MOLDING SKINLESS SAUSAGE
Joseph L. Ammons, 1617 Lawson Lane, and Floyd H. Morrow, 113 N. Beverly, both of Amarillo, Tex. 79106
Filed Mar. 17, 1965, Ser. No. 440,571
19 Claims. (Cl. 17—45)

This invention relates to sausage molding machines and more particularly to sausage molding machines which mold skinless sausages in an elongated cylindrical form and which sausage is of sufficient density to hold the form after the sausage is ejected from the mold.

Various sausage molding machines have been proposed heretofore, but these for the most part required a mechanism driven by electric motors and the like, which of necessity had to work under conditions adverse to electric motors such as being washed with water and steam at high pressure and being subject to change of temperature, moisture, and the presence of various animal matter, which made it difficult for the apparatus to produce cold, firm sausage.

In the present device most of the mechanical functions are performed by fluid actuated mechanisms such as air actuated cylinders and plungers.

The present machine is so constructed that sausage may be fed thereinto from a source of sausage supply through a stuffer valve and ejected into a multiplicity of elongated mold cylinder cavities so that the weight, density, and length may be controlled, within specified limits. When the machine is once set in operation, it is fully automatic and will mold sausages of the same size, weight, and density so long as sausage material is fed into the machine.

An object of this invention is to provide an improved mechanism for molding skinless sausages and the like, the weight, density, and length of which may be fully controlled to specified limitations.

Another object of the invention is to provide a sausage forming machine that is actuated by fluid power and will operate under adverse conditions in cold, moist refrigeration vaults.

Still another object of the invention is to provide a machine that may be manually operated or may be fully automatic.

Another object of this machine is to provide a sausage molding machine which will mold a multiplicity of skinless sausages and deliver these onto a sheet of paper so they may be directed onto a conveyor and boxed automatically.

A further object of the invention is to provide a molding machine with a mold cylinder having an elongated cavity therein, with cylinder closure members which are brought into abutting relation exteriorly of the elongated cavity at atmospheric pressure and which are moved into the cavity in sealed, abutting relation and subsequently moved apart to create an elongated, vacuumized cavity into which a moldable material is introduced, under pressure, until the cavity is filled, then terminating the entrance of the moldable material into the elongated cavity and, subsequently, further elongating the cavity to relieve the pressure and to allow for expansion of the molded material inside the elongated cavity, then discharging the molded material from the cavity of the mold cylinder.

Another object of the invention is to provide an automatic stuffer control valve which will admit only the required amount of sausage into the molds of the molding machine to give sausage of the correct weight, density and length.

Still another object of the invention is to provide adjustable sausage compression control mechanism.

Still another object of the invention is to provide an adjustable weight control mechanism.

Another object of the invention is to provide a two cycle air circuit to insure positive operation each time the sausage stuffer valve directs sausage or the like into the elongated mold cylinder cavities.

Still another object of the invention is to provide a valving mechanism which stops both the mechanism and the flow of the sausage into the machine simultaneously.

A further object of the invention is to provide a sausage molding machine which provides an internal feeding mechanism into the mold cylinders to prevent leakage of sausage material during the molding cycle.

Yet another object of the invention is to provide an internal feed molding apparatus which permits expansion of sausage in the mold, after the final stage of compression.

A still further object of the invention is to provide a speed control for the actuating mechanism of the sausage molding machine which will enable the selective variation of the speed of the mechanism.

Yet a further object of the invention is to provide a removable mold cylinder block, which is secured in place by fluid pressure while the machine is operating.

A still further object of the invention is to provide a sausage molding machine which does not require manual lubrication.

Another object of the invention is to provide a machine that is relatively simple in construction, easy to assemble and disassemble for cleaning and repair, and is not readily damaged by moisture being directed thereinto.

Still a further object of the invention is to provide a rapid movement cutting mechanism to cut the ejected sausages away from the face of the ejecting pistons so rapidly as to prevent the sausages sticking to the cutting blade.

With these objects in view and others which will become manifest as the description proceeds, reference is to be had to the accompanying drawings in which like reference characters designate like parts in the several views thereof, in which.

With more detailed reference to the drawings, the numeral 1 designates generally a main frame having adjustable support members 2 secured to the lower side thereof for seating on a conventional floor or on such work space upon which it is desired to seat the machine for operation. The numeral 4 designates generally the operating mechanism which comprises a frame 6 which is secured to main frame 1 by adjustable bolt members 8.

Figure 1:
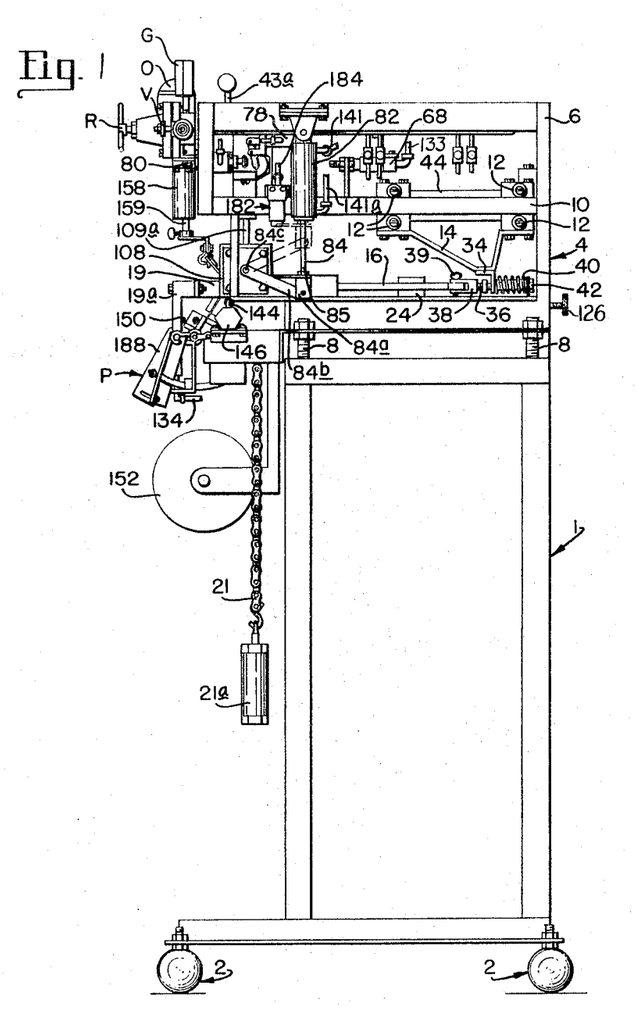
FIG. 1 is a side elevational view of the completed skinless sausage molding machine.
Figure 7:
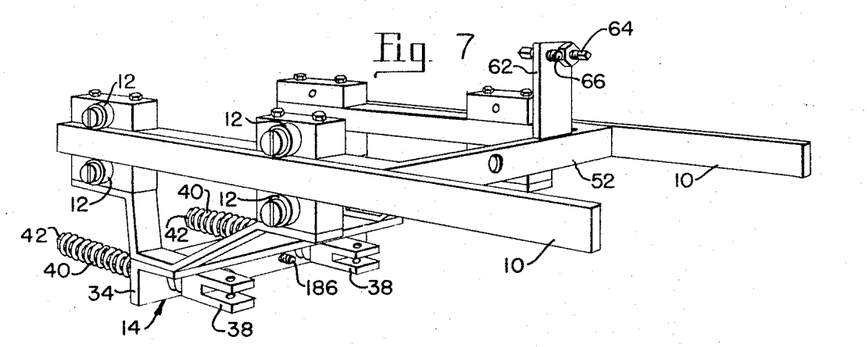
FIG. 7 is a perspective view of the movable carriage and track members, the carriage of which actuates the pistons within the molding cylinders.

The frame 6 has spaced apart trackways 10 mounted longitudinally on the sides of frame 6 to receive rollers 12, which rollers are journaled on carriage 14, as will best be seen in FIGS. 1 and 7, which rollers roll along trackways 10 in guided relation.

The carriage 14 connects with pusher rod assembly 16, which pusher rod assembly has a head 18 thereon which carries plugs or closure members 20 which close and seal the outer ends of the sausage mold cylinders 30, in cylinder block 108.

A piston assembly, designated generally by the numeral 22, is mounted on a block 24, with the piston rods 26 each carrying a piston 28 thereon to form a closure member to seal each mold cylinder 30, which respective pistons are in a position to pass into the mold cylinders 30 to form the compressing unit for the skinless sausages, as will be brought out more fully hereinafter. Each pusher rod 16 passes through one of the cylinders 32 in cylinder block 108 on each side of the molding cylinders 30. The carriage 14 extends downwardly and has a transverse bar 34 thereacross which has spaced apart apertures therein to receive a pair of threaded rods 36, each of which has a clevis 38 on the forward end thereof. On the opposite side of the transverse bar 34 on each rod, there is a compression spring 40, the tension of each compression spring 40 is regulated by a nut 42.

The pusher rods 16 are each apertured to enable coupling of the rods of each clevis 38 by pin 39, so upon movement of the carriage 14, the pusher rods 16 will move in unison therewith, except under certain conditions, whereupon the springs 40 will be compressed.

Figure 10:
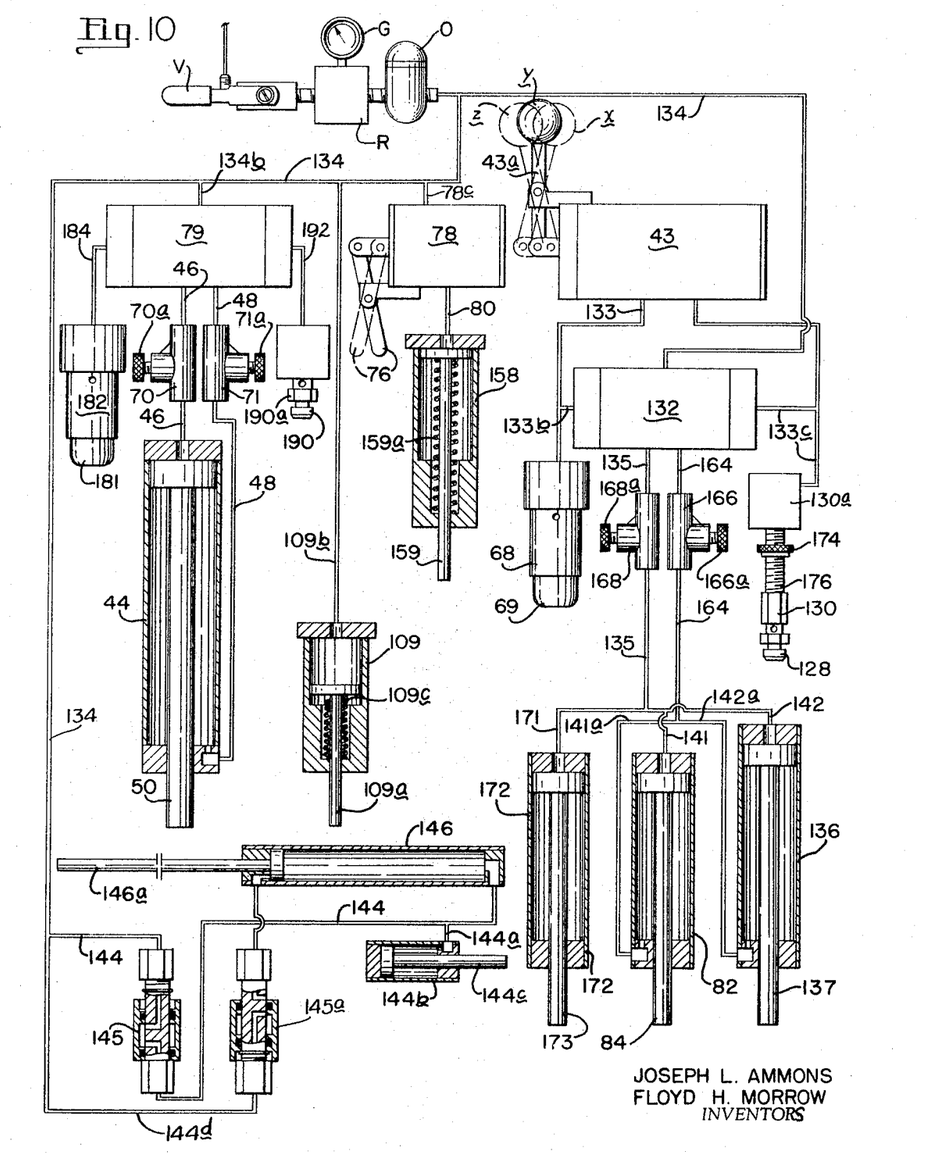
FIG. 10 is a diagrammatic view of the fluid system and cylinders with portions shown in section and with portions shown in dashed outline, to show alternate positions.
Figure 11:
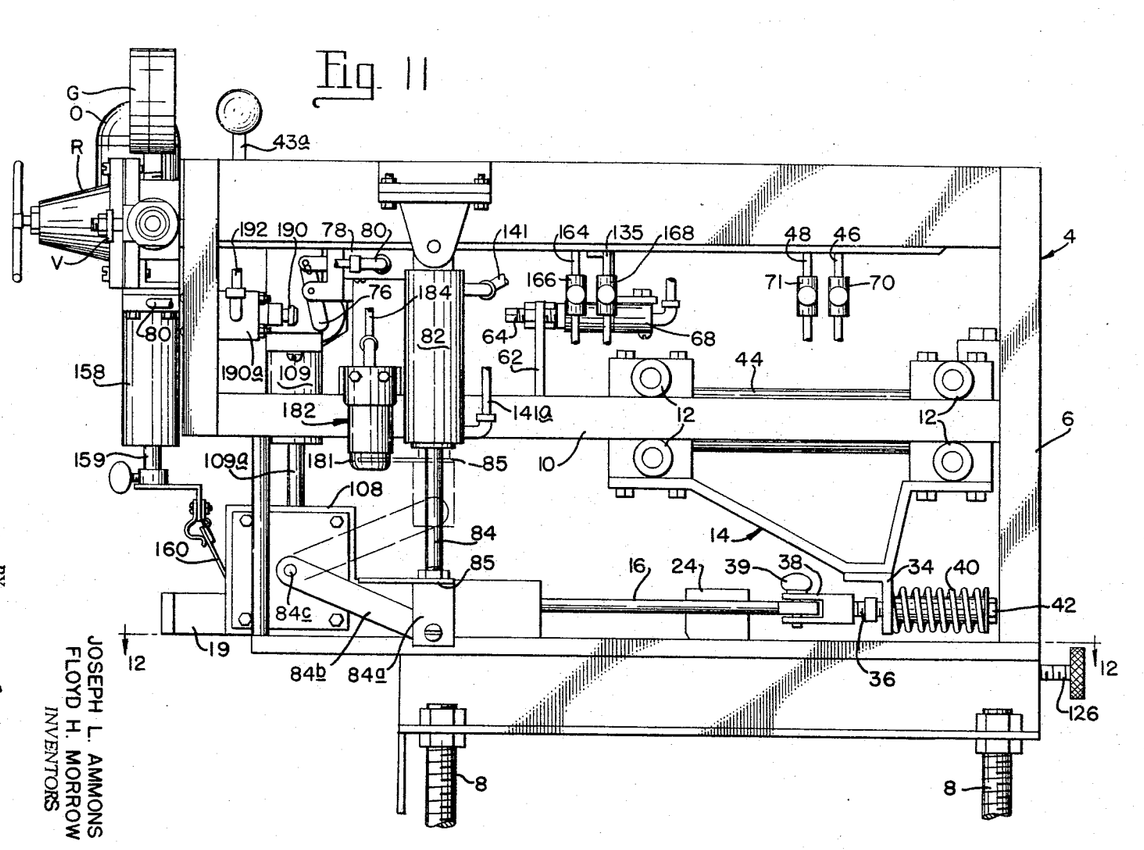
FIG. 11 is an enlarged side elevational view of the sausage stuffing mechanism with the support base broken away and with parts shown in section, and with the papering machine removed therefrom.
Figure 12:
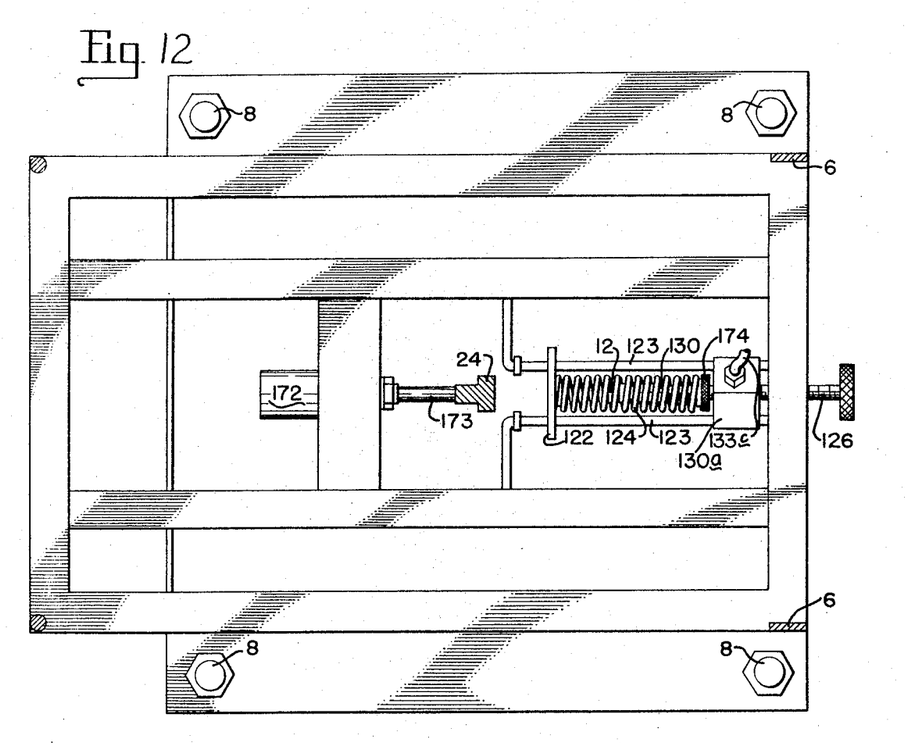
FIG. 12 is a sectional view taken on line 12—12 of FIG. 11, looking in the direction indicated by the arrows.

The sausage molding machine is operated by fluid pressure, preferably by air pressure, and has an air compressor (not shown) withdrawing air from the atmosphere and directing the air into air supply line 134, FIG. 10, and through valve V through a pressure regulator R, which regulator regulates the output of pressure, as will be indicated on gauge G. Air is directed through an oiler O in the manner well understood in the art of pneumatics for operating air control devices.

The present air system is of the restrictive or back pressure type. Upon opening a main air supply line control valve V, air pressure is directed from the source of supply, into and through main air supply line 134, through regulator R, through an oiler O to exert air pressure on gauge G, which main air supply line is connected to the various valves and actuating elements, as will be more fully brought out hereinafter.

Figure 18:
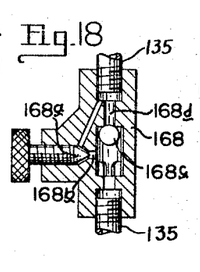
FIG. 18 is a longitudinal sectional view through a flow and check valve.
Figure 19:
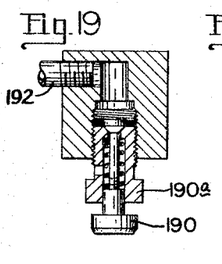
FIG. 19 is a longitudinal sectional view through a button bleeder valve.

The air is directed from the source of supply through oiler O, into the main air supply line 134 to reversing valve 132 which directs air to and from oscillating valve cylinder 82, stuffer valve cylinder 136, and piston retractor cylinder 172. The air is directed from the air supply line 134 into reversing valve 132, through port 134a, and with the spool valve member 132a in the position, as shown in full outline in FIGS. 10 and 16, air is directed through an annular passage 132d out through port 164a into air line 164 through a flow and check valve 166, FIG. 10, which valve is of the same construction as shown in FIG. 18, with the air flowing unimpeded into air lines 141a and 142a, which will move plungers 84 and 137 into retracted position within the oscillating valve cylinder 82 and stuffer valve cylinder 136, respectively, to close the oscillating valve 100 and stuffer valve 118 respectively, simultaneously. The plunger 84 is pivotally connected through a clevis 84a to a lever 84b (FIGS. 1, 4, 5, 6, 8 and 11) which is fixedly secured to shaft 84c of oscillating valve 100 to impart arcuate movement to the shaft 84c of the oscillating valve 100 upon reciprocation of plunger 84 in cylinder 82. The plunger 137 is pivotally connected through clevis 137a to linkage member 137b (FIGS. 3, 4, 5, 6 and 9) to a lever 137c which is secured to shaft 137d in stuffer valve 118 to impart arcuate movement to the shaft 137d thereof upon reciprocation of plunger 137 in cylinder 136.

Figure 8:
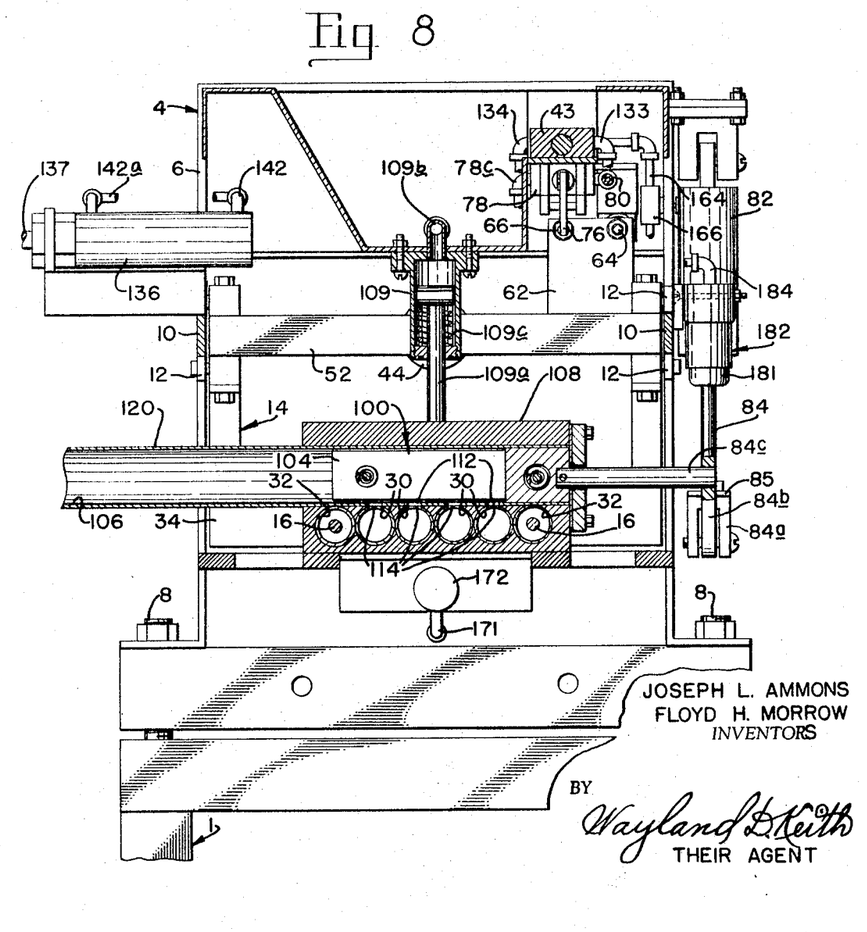
FIG. 8 is a sectional view taken on the line 8—8 of FIG. 2, looking in the direction indicated by the arrows.

Simultaneously, with the retraction of plungers 84 and 137, air is applied, through main air supply line 134, to branch air line 109b which leads to clamp cylinder 109 which clamps cylinder block 108 in place, which clamp cylinder is a single acting cylinder, and which urges plunger 109a thereof outward to compress spring 109c, which plunger is moved into contact relation with cylinder block 108 to clamp the cylinder block in place, as will best be seen in FIGS. 1 and 8, which holds the cylinder block 108 in fixed relation with respect to the mechanism 4, until it is desired to cease operation of the machine for cleaning, inspection or repair.

Figure 2:
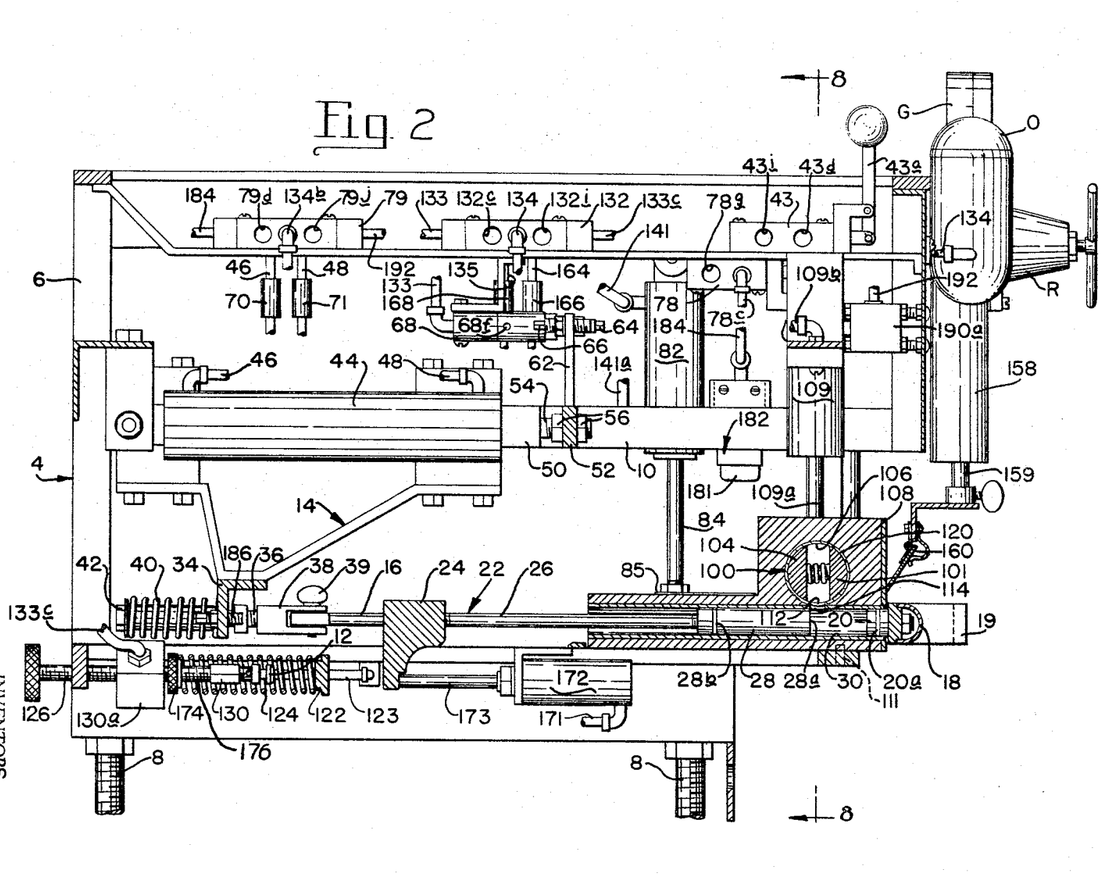
FIG. 2 is an enlarged longitudinal, sectional view through the operating mechanism of the machine taken approximately along the line 2—2 of FIG. 9, looking in the direction indicated by the arrows.
Figures 3, 4, 5, 5A, 6:
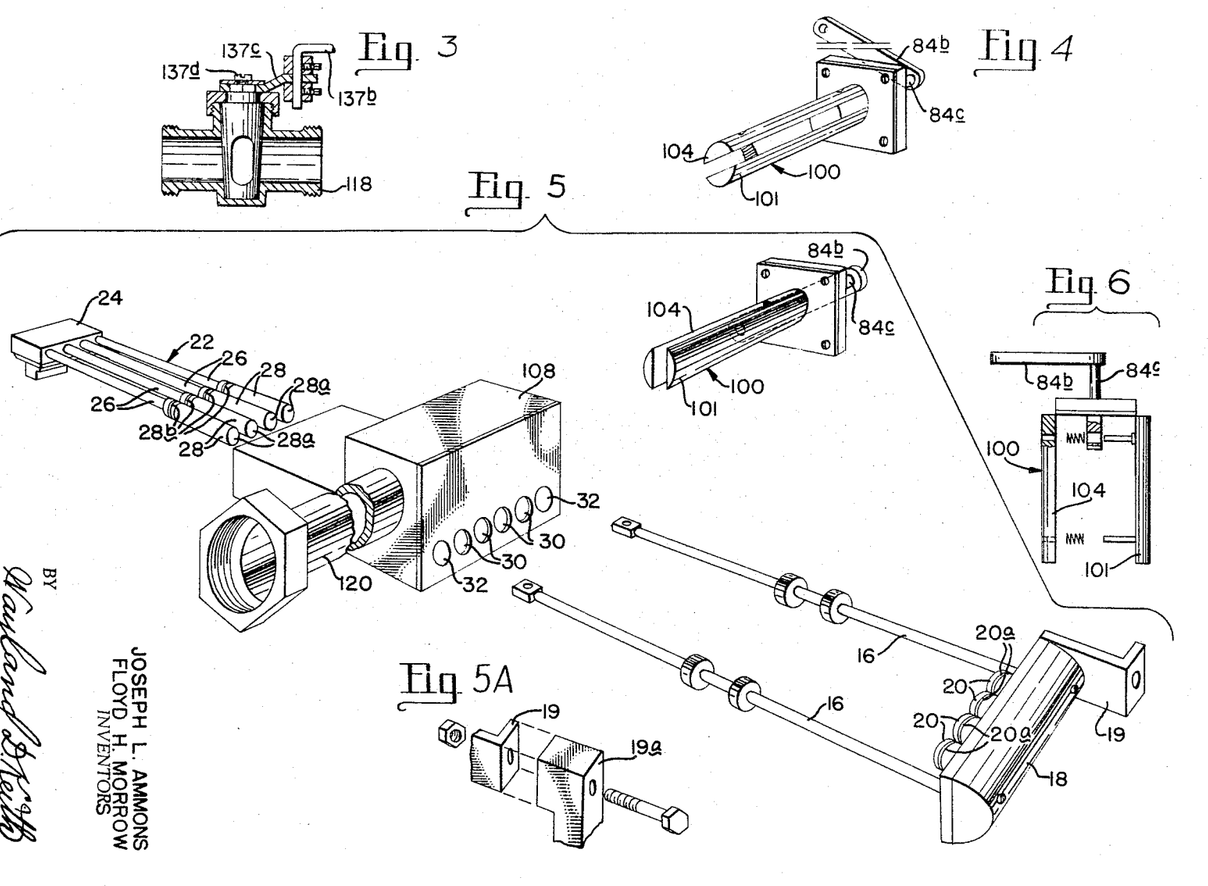
FIG. 3 is an enlarged, longitudinal, sectional view with parts shown in elevation of the air cylinder operated stuffer valve and showing a portion of a linkage connected thereto.
FIG. 4 is a perspective view of a segmental valve for directing sausage material into the mold cylinders.
FIG. 5 is an exploded view of the cylinder and piston assembly, showing the valve in position to direct sausage material into the molding cylinders.
FIG. 5A is a fragmentary exploded, perspective view of the papering machine mounting bracket on the papering machine and the complementary bracket on the sausage molding machine.
FIG. 6 is an exploded view of the segmental valve for directing sausage material into the sausage molding cylinders.
Figure 15:
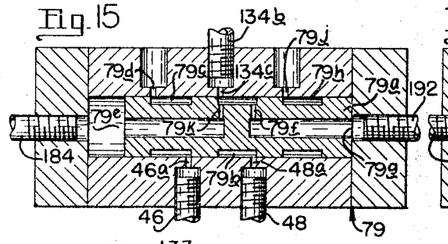
FIG. 15 is a longitudinal sectional view through the reversing valve for the main ejector cylinder.

Simultaneously, air is directed from main air supply line 134 into branch air line 134b, through port 134c into the main cylinder, four-way reversing valve 79, FIGS 10 and 15, and with the spool valve plunger 79a of the valve 79 in the position as shown in full outline in FIG. 15, the air is directed through annular passage 79b, out through port 48a into air line 48 and through flow and check valve 71, without restriction, to the plunger end of main cylinder 44, which will retract plunger 50 in main cylinder 44 into the position as shown in FIG. 10, with the air being exhausted from cylinder 44 out through air line 46, through flow and check valve 70 in a restricted manner, and out through port 46a, through annular passage 79c and out through exhaust port 79d to atmosphere. Whereupon, the plunger 50, of the main cylinder 44 is connected to carriage 14 through transverse bar 52 by screw threaded portion 54 which bar 52 has nuts 56 thereon on each side thereof. The carriage 14 will be moved to the rear-most position, as shown in FIG. 2, which will move pusher rod assembly 16 rearward to move the plugs or closure members 20 into sealing relation with the outer end of the bore of the respective mold cylinders 30. This movement causes plugs 20 to contact the face 28a in abutting relation at atmospheric pressure of the respective pistons 28 to move the pistons or closure members rearward into the respective cylinders 30 but in contact relation with plugs 20. This action prevents air entering the cylinders 30, preparatory to the introduction of sausage material as will be more fully described hereinafter.

Each plug has an O-ring 20a fitted therearound to complementally fit into the respective cylinders 30 in sealing relation when the plugs 20 are moved thereinto. Each piston 28 likewise has an O-ring 28b therearound, so as to fit the respective pistons 28 in sealing relation with the respective cylinders 30.

Figure 9:
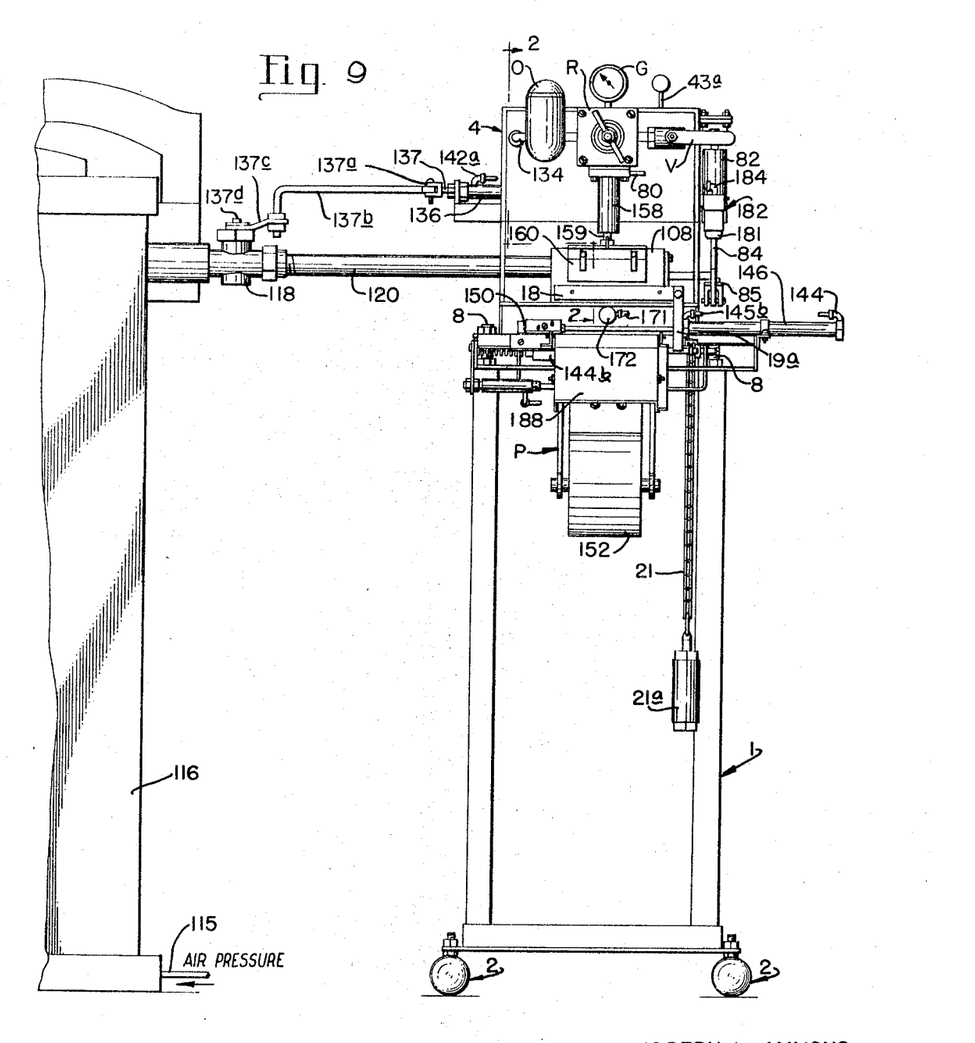
FIG. 9 is a front elevational view of the molding machine, showing the molding machine connected to the stuffer valve for directing sausage material into the sausage molding machine, and showing a "papering machine" mounted thereon.

Simultaneously, with the above mentioned cycles, air is directed through main air supply line 134 into and through friction slide valve 145, with the valve in the position shown in FIG. 10, with the air passing through air supply line 144 to the end of paper cutter cylinder 146 opposite the plunger 146a thereof which moves plunger 146a, carrying cutter blade 150 to an extended position, as is best seen from FIGS. 9 and 10. The air is simultaneously directed from air supply line 144 into and through air line 144a into the plunger end of clutch actuating cylinder 144b to retract plunger 144c, which engages a clutch on the papering machine, designated generally at P, to control the feeding of paper or film from roll 152, in a manner set out in our co-pending application, filed Mar. 17, 1956, Ser. No. 440,438, Apparatus for Placing Sheet Material on a Surface and Cutting to a Predetermined Length. As the plunger 146a is moved outward, air is exhausted through friction sleeve slide valve 145a, when the valve 145a is in the position as shown in FIG. 10. An air line 144d is connected with friction sleeve slide valve 145a to direct air into the opposite end of cylinder 146, as is fully brought out in our co-pending application, as mentioned above.

Figure 14:
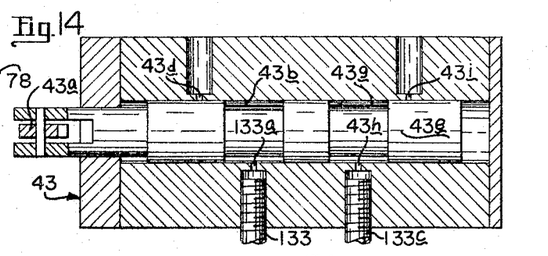
FIG. 14 is a longitudinal, sectional view through the start and stop valve, with the slidable valve member therein being shown in elevation.

With the above operations performed, the machine is ready to be started; to start the operation of the sausage molding machine, the control level 43a on the stop and start, three-way bleeder valve 43 is in upright position y, as shown in full outline in FIG. 10, the lever 43a is moved to the right, FIG. 10, to position x, which will move spool 43e to the left, FIG. 14, so that annular passage 43b will register with ports 133a and 43d which will form an air passage to connect air bleeder line 133 with bleeder port 133b in reversing valve 132, with the air passing out of cavity 132e through port 132b into bleeder line 133 and through port 133a on manually controlled valve 43, thence through annular passage 43b and out through port 43d to atmosphere. With the relief of pressure in chamber 132e, air pressure from the main air supply line 134 will pass through port 134a through passage 132f to exert pressure in the chamber 132g so as to move spool valve member 132a to the left, as viewed in FIG. 16, so that the annular passage 132d will register with ports 134a and 135a, whereupon, air will be directed from main air supply line 134 through port 134a, annular passage 132d and through port 135a into air supply line 135 to flow freely through flow and check valve 168, simultaneously into conduits 141 and 142 and 171, whereupon, the plungers 84, 137 and 173 of the oscillating valve cylinder 82, the stuffer valve cylinder 136, and the piston retractor cylinder 172, respectively, will be moved to extended position, whereupon, simultaneously with the introduction of air into air supply lines 141 and 142, air is exhausted from the respective plunger ends of cylinders 82 and 136 out through air lines 141a and 142a into air line 164, and through flow and check valve 166, in restricted relation, to buffer the movement of the respective plungers 84 and 137, whereupon, air is exhausted through port 164a, through annular passage 132h in spool 132a, FIG. 16, of reversing valve 132 and out through port 132i to atmosphere. Upon extension of plungers 84, 137 and 173, the oscillating valve 100 and stuffer valve 118 will be opened, and cylinder 172 will retract pistons 28 to a position to open sausage inlet ports 114, and in so doing, a partial vacuum will be created in the respective cylinders 30, by this movement of pistons 28 out of contact relation with plugs 20, which action will position the pistons 28 adjacent the rear edge of sausage inlet ports 114 so as to allow sausage material to be pulled into the respective mold cylinders 30, by the partial vacuum, whereupon, the sausage material is also urged from stuffer supply casing 116, through open stuffer valve 118, through sausage supply pipe 120 into the cylinder 106 of the oscillating valve 100 in which is positioned spaced apart, segmental valve elements 101 and 104, and with the passage between the segmental valve elements being in communication with outlet ports 112 in oscillating valve cylinder 106 and sausage inlet ports 114 in register therewith, sausage material is directed into mold cylinders 30; simultaneously with the sausage being drawn into mold cylinders 30, by the partial vacuum, the sausage is also forced thereinto under pressure exerted on sausage material in the stuffer supply casing 116.

Figure 16:
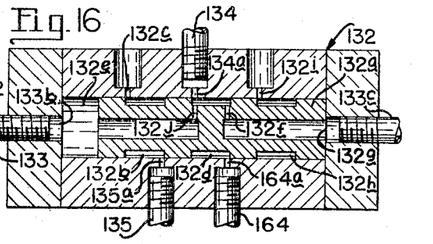
FIG. 16 is a longitudinal, sectional view through the reversing valve for the oscillating valve cylinder, the stuffer valve cylinder and for the piston retractor cylinder.

As soon as the spool 132a, in reversing valve 132, moves from the position as shown in FIG. 16, to the opposite end of the cylinder therein, the lever 43a is moved from the position as indicated at x to the position indicated at y, FIG. 10, the machine will be set in automatic cycle of operation and will thus continue so long as the machine is supplied with sausage material, unless the lever 43a is moved to a stop position as indicated at z, FIG. 10.

Figure 20:
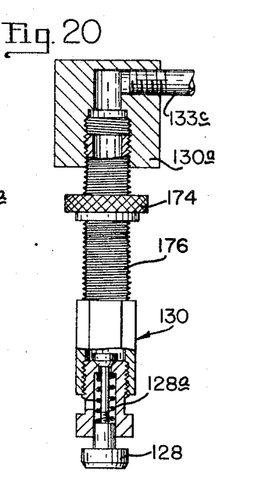
FIG. 20 is a diagrammatic, longitudinal view through a button bleeder valve similar to that shown in FIG. 19, except a tubular extension is shown thereon, and with an adjustment nut shown thereon in full outline, other portions of the valve being shown in full outline.

As the sausage material is being introduced, under pressure, into mold cylinders 30, the reaction of pressure of fluid sausage material reacts on the faces 28a of pistons 28, which will move pistons 28 rearwardly, with the sausage material flowing into the respective cylinders 30 to prevent air pockets or voids being formed in the sausage material within the cylinders 30. The pressure under which the sausage material is being moved into cylinders 30, will force block 24 rearward into abutting relation with transverse bar 122, which bar moves on parallel slide bars 123 to react on spring 124 to compress the spring to a predetermined setting of compression, as determined by adjustment nut 174, which is positioned on hollow, screw threaded extension member 176. The adjustment of the compression of spring 124 will determine the density of the sausage material within the cylinders 30, whereupon, when the transverse bar 122 is moved into contact with button 128 of the button bleeder valve 130, the button 128 is depressed against the tension of spring 128a therein, which will open a port in bleeder valve 130, FIGS. 10 and 20, which bleeder valve 130 is connected through air bleeder line 133c, which will relieve pressure from chamber 132g, FIG. 16, which will permit air, under pressure, from main air pressure line 134 to pass into port 134a into annular passage 132d in spool 132a and through passage 132j, to direct air, under pressure, into chamber 132e, which will move spool valve member 132a of reversing valve 132 to the position as shown in full outline in FIG. 16, with the air behind the respective plungers in cylinders 82, 136 and 172 exhausting out through lines 141, 142 and 171 into air line 135, and with the check member in flow and check valve 168 closed by air pressure exerted therein, as shown in FIG. 18, the air is forced through restricted orifice 168b in valve 168, and through air line 135, port 135a into annular passage 132b and through port 132c to atmosphere, which completes the first cycle of operation.

Upon the shifting of spool member 132a of reversing valve 132, air is directed through air lines 164, 141a and 142a, under pressure, into the plunger end of the respective cylinders 82 and 136, the stuffer valve 118, which is connected to plunger 137, will be closed, as will oscillating valve 100, which connects to plunger 84. The plunger 84 carries an outstanding arm 85 thereon, which arm moves upward into contact relation with plunger 181 of re-cycling bleeder valve 182, which will bleed air from bleeder line 184 and from chamber 79e of four-way reversing valve 79, FIG. 15, in so doing, air from air supply line 134 will be directed through air supply line 134b through port 134c in four-way reversing valve 79, which valve is connected to main cylinder 44, into annular passage 79b in spool 79a and through passage 79f to exert pressure in chamber 79g, which will move spool 79a, under air pressure, to the left in valve 79, as shown in FIG. 15, which will initiate the second cycle of operation. Whereupon, air will be directed from main air supply line 134 through branch air line 134b, port 134c in valve 79, through annular passage 79b, and out through port 46a in valve 79 and into air line 46 and through flow and check valve 70, in an unrestricted manner, and into the end of the main cylinder 44 opposite the plunger 50 thereof, which will move plunger 50 outward, with the air from the plunger end of cylinder 44 being discharged out through air line 48 and through flow and check valve 71 in a restricted manner to buffer the outward movement of plunger 50, as the check valve therein will be seated and the air therein will be forced through a restricted orifice, out through air line 48, port 48a in four-way reversing valve 79, through annular passage 79h to exhaust through port 79j in valve 79 to atmosphere.

As the plunger 50 moves forward, the carriage 14, attached thereto by transverse bar 52, moves therewith, whereupon, pusher rod assembly 16, which passes through cylinders 32, moves head 18 forward. Plugs 20 are attached to the head 18 and will move out of the forward ends of the respective cylinders 30, which permits the sausage material, which is formed into sausages in the cylinders 30, to expand longitudinally within the sausage mold cylinders 30, which prevents distortion or deformation of the molded sausages, as the plugs 20 move outward. As the carriage 14 moves forward the plugs 20 move out of contact with the sausage, adjustable screw members 186 move into contact relation with block 24, which screw members 186 adjust the outer terminal position of faces 28a of pistons 28. The block 24, piston rods 26 and pistons 28 move in unison with pusher rods 16, head 18 and plugs 20, and upon forward, outward movement of the head 18, a bracket 19, which is attached thereto, is moved outwardly and moves an arm 19a, which actuates the papering machine mechanism, as set forth in our co-pending application, as set out above. A chain 21 is pivotally connected to arm 19a and moves outward therewith to lift weight 21a, which is attached to the distal end thereof.

Simultaneously, with the outward movement of arm 19a, the chain 21 engages a drive mechanism to roll the paper outward as the arm 19a, through associated mechanism, raises apron 188 to a substantially horizontal position, with a sheet of paper or film thereon to receive the sausage about to be ejected from cylinders 30, which mechanism for receiving paper on which the sausage is to be dispensed, is fully brought out in our co-pending application, as stated above.

As block 24 moves forward, it contacts plunger 173 of piston retractor cylinder 172 and moves the plunger to a retracted position. Air from cylinder 172 being exhausted through air lines 171, 135, through flow and check valve 168, in a restricted manner, out through port 135a in reversing valve 132, through annular passage 132b and out through port 132c to atmosphere. By restricting the passage of air outward through passage 168b by needle valve 168a, the speed of ejection of sausages from cylinders 30 can be accurately controlled.

Figure 13:
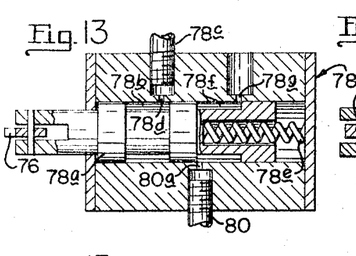
FIG. 13 is a longitudinal sectional view through the cutter control valve.

Upon continued movement of plunger 50 of main cylinder 44 and carriage 14, screw threaded adjustment member 66, which is mounted on upstanding arm 62 mounted on traverse bar 52, will move into contact relation with lever 76, on sausage cutter control valve 78, which will move the valve from the position as shown in FIG. 13, so as to move the spool 78a into position so that annular passage 78b will connect air line 134 through air line 78c to port 78d, thence through annular passage 78b and port 80a into air line 80 to direct air, under pressure into sausage cutter blade cylinder 158, which will move plunger 159 thereof rapidly outward to move cutter blade 160 across the outer face of cylinder block 108, to sever the sausage meat from the face end 28a of pistons 28; simultaneously, with the extreme forward movement of carriage 14, the block 24, carrying piston rod assembly 22, has moved the pistons 28 to the outer terminal position in cylinders 30. The outer face terminal point of pistons 28 is adjusted by turning screw threaded members 186. The inner terminal location of faces 28a of pistons 28 is adjusted by the adjustment of thumb screw 126, by moving bleeder valve mounting block 130a and bleeder valve 130 forward or backward on parallel slide bars 123. In this manner the exact length of the cavities to be filled with sausage material in cylinders 30 can be accurately adjusted, without affecting the density control setting of spring 124. A threaded tubular extension 176 is screw threaded into bleeder valve mounting block 130a and into bleeder valve 130 and has a spring adjusting nut 174 thereon, which nut 174 adjusts the compression spring 124, which spring surrounds tubular extension 176 and is disposed between nut 174 and traverse bar 122.

Simultaneously with the opening of valve 78, the lever 76 is moved into engagement with button 190 on button bleeder valve 190a, which, in turn, bleeds air from the cavity of chamber 79g in valve 79, FIG. 15, which permits air from air supply line 134, under pressure, to be directed through branch air line 134b, through port 134c into annular passage 79b, whereupon, air is directed axially through passage 79k into chamber 79e to move spool 79a from the left end of valve 79, to the position shown in full outline in FIG. 15.

With the spool being so shifted, the air is then directed from the main air supply line 134, through branch air supply line 134b, port 134c, through annular passage 79b and out through port 48a into air supply line 48 through flow and check valve 71 in an unrestricted manner, thence through air supply line 48 to the plunger end of the main cylinder 44, which will act upon the plunger to move the plunger 50 into a retracted position, as shown in FIG. 10, thereby exhausting air out through air line 46 through flow and check valve 79, in a restricted manner, through air line 46, port 46a in valve 79, and into annular passage 79c to exhaust out through passage 79d to atmosphere. As the carriage 14 moves away from lever 76, on cutter control valve 79, a spring 78e will urge spool 78a of spool valve 78 outwardly to stop the air supply to cylinder 158 and to permit air to be exhausted from cutter blade cylinder 158 out through air line 80, through port 80a, through annular passage 78f to exhaust through passage 78g to atmosphere.

Upon rearward movement of valve control lever 76, the lever moves away from button 190 of bleeder valve 190a, which allows the valve 190a to close, ready for subsequent cycle operation. Upon the ports being opened to exhaust air from cutter blade cylinder 158, the spring 159a moves plunger 159 rapidly upward to disengage the cutter blade from the sausage which has been ejected from the mold cylinders 30. This re-positions the cutter blade 160 for the next cycle of operation.

Figure 17:
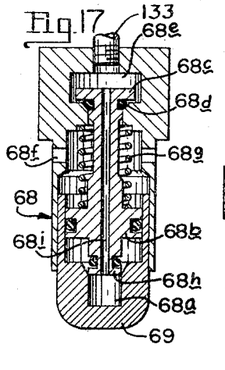
FIG. 17 is a longitudinal sectional view through a button type re-cycling valve.

As the carriage 14 moves to the rear-most position, adjusting screw 64, on upstanding arm 62 moves into contact relation with a re-cycling bleeder valve 68, FIGS. 2, 10 and 17, whereupon the movable button 69 is contacted by adjustable screw member 64, the movable button 69, which has a chamber 68a therein, which chamber is filled with air under pressure, forces valve body 68b rearward to move valve 68c off seat 68d, which will permit air to escape from chamber 68e, FIG. 17, and chamber 132e, FIG. 16, through port 68f to atmosphere, which will permit spool 132a in reversing valve 132, as shown in FIG. 16, to shift to the left, which will permit the spool 132a in reversing valve 132 to move to the extreme left end, under air pressure passing from main air supply line 134, through port 134a, annular passage 132d, air passage 132f into chamber 132g, which will maintain spool 132a in this position whereupon, air will pass from main air supply line 134, through port 134a, annular passage 132d and out through port 135a into air line 135 to repeat the cycle of operation of cylinders 82, 136 and 172, as herein before set forth, with the air exhausting from the oscillating valve actuating cylinder 82 and stuffer valve cylinder 136, out through air line 164 and port 164a, annular passage 132h, port 132i to atmosphere, to repeat the cycle.

As soon as the pressure is relieved from chamber 68a in bleeder valve 68, by air passing out through port 68f, a spring 68g urges valve body 68b forward, which forces valve body 68h into telescoped relation inside chamber 68a, until the adjustment screw 64 moves out of contact relation with movable button 69, whereupon, chamber 68a refills with air, under pressure, from main air supply line 134, passing through port 134a into annular passage 132d into passage 132j and out through passage 133b into air line 133 and into chamber 68e and through passage 68i to force button 69 outwardly, thereby to refill chamber 68a with air, under pressure, which completes the second or molding cycle and sets all valves and mechanisms ready to automatically reinstitute the first or filling cycle.

After the desired molding cycle has been completed and it is desired to stop the machine, the valve control lever 43a of start and stop, three-way bleeder valve 43, is moved manually from the central position, as indicated at y, in FIG. 10, to the position z, indicated in dashed outline therein, whereupon spool 43e of valve 43 will be moved inwardly so that annular passage 43g will register with ports 43h and 43i, whereupon, air is bled from chamber 132g in valve 132 and out of bleeder valve 130 through line 133c, through port 43h, through annular passage 43g and out through port 43i in stop and start, three-way bleeder valve 43. This permits air under pressure to be directed from main air supply line 134 through port 134a, annular valve passage 132d in the valve spool 132a of reversing valve 132, and through pasasge 132j into chamber 132e to exert pressure on the end of spool 132a of valve 132 to move the valve to the position as shown in full outline in FIG. 16. Whereupon, air will be directed from main air supply line 134, through port 134a into annular passage 132d in spool 132a, thence out through port 164a in valve 132 and into air line 164 and through flow and check valve 166 in unrestricted manner, and into air lines 141a and 142a into the plunger end of oscillating valve cylinder 82 and stuffer valve cylinder 136, respectively, to move the respective plungers 84 and 137 into retracted position, which will close oscillating valve 100 and stuffer valve 118, whereupon, air is exhausted from oscillating valve cylinder 82, stuffer valve cylinder 136 and piston retractor cylinder 172 from the end opposite the plunger of the respective cylinders, into air lines 141, 142 and 171, respectively, into air line 135 and through check and flow valve 168, FIG. 18, and with check valve member 168c closing passage 168d, air is diverted through passage 168b in a restricted manner, which restriction embodies a needle valve 168a, which constricts the discharge passage 168b therein to the desired adjusted restriction, to regulate the out-flow of air therethrough and through port 135a into annular passage 132b and out through discharge port 132c in reversing valve 132, which will stop the operation of the sausage molding machine, closing the stuffer valve 118 and the oscillating valve 100, thereby preventing further sausage from entering the machine, until valve control lever 43a of valve 43 is moved to position x, FIG. 10, which will immediately stop the machine, if it is operating in the first or filling cycle, at the time the lever 43a of valve 43 is moved to the position indicated at z. However, if the machine is in the second cycle of operation the molding cycle is reinstated, as set forth above.

Upon moving lever 43a into the position as indicated at z, FIG. 10, the mechanism will continue through the normal cycle and eject any sausage from mold cylinders 30, and then return the carriage 14 rearwardly to complete cycle two, in its entirety. However, when the button 69 of button bleeder valve 68 is depressed, air is bled therefrom and from spool valve member 132a in reversing valve 132. The spool valve member 132a does not shift, as it normally would, because the air pressure from chamber 132g in reversing valve 132 has been bled out through air line 133c, port 43h, annular passage 43g and out through port 43i to atmosphere, in three-way stop and start valve 43.

When the molding operation has ceased and the machine is stopped, the lever 43a may be returned to position y, indicated in FIG. 10, which will prevent further loss of air from port 43i. Both bleeder valves 68 and 130 are then recharged with air pressure, however, the machine will not operate until lever 43a is again returned, momentarily, to the position indicated at x, FIG. 10, to bleed the air pressure from air line 133. This allows the air pressure in line 133e to force the spool valve member 132a to shift to the left, FIG. 16, which results in air being directed from air supply line 134 to the stuffer valve cylinder 136, the oscillating valve cylinder 82 and to the piston retractor cylinder 172 through air lines 135, flow and check valve 168, air lines 142, 141 and 171, respectively, with the plunger 173 moving the pistons 28 to the rear edge of sausage inlet ports 114. This institutes the filling cycle and puts the machine back into automatic operation, upon returning lever 43a to the position, as indicated at y, FIG. 10.

The present sausage molding machine is so designed that the speed of each step of the operation can be controlled independently, without altering the speed of operation of another step in the operation of the molding machine. The outward speed of movement of plunger 50, of the main cylinder 44, is controlled by a restricted orifice in valve 71, in air line 48 which leads from the plunger end of cylinder 44 to four-way valve 79. The valve is a combination flow and check valve of the construction as shown in FIG. 18, therefore, by adjustment of needle valve member 71a the outward speed of the plunger 50 may be regulated from a complete, full flow release of air therefrom to a gradual movement by restricting the orifice therein, such as orifice 168b in valve 168, or if desired, the needle valve member may be completely closed, whereupon, the movement of the plunger will cease.

The inward movement of plunger 50 permits full flow of air through line 48 and the orifice in valve 70 is restricted by a needle valve member 70a, in a manner similar to the restricting of the orifice in valve 71. With the movement of plunger 50 regulated to the desired speed in either direction, the movement of carriage 14 is also regulated to the same rate of speed, to contact the various valves and to perform the various functions, as have been set out hereinbefore. The control of the speed of the plunger 50, in either direction, likewise controls the steps of operation of the molding machine with respect to that particular step of the operation.

A valve 166 is within air line 164, which connects with branch air lines 141a and 142a, which air lines connect respectively to the plunger ends of oscillating valve cylinder 82 and stuffer valve 136, therefore, by regulating the flow of air from cylinders 82 and 136, while pressure is being applied to the opposite ends of the plungers, through air lines 141 and 142, the speed of the plunger of each of these cylinders, on the outward movement, can be minutely regulated by regulating the needle valve member 166a to restrict the outflow of air through the orifice thereof, which valve is similar in construction to valve 168, shown in FIG. 18. At the same time that air is being restricted, air may be allowed to flow from the plunger ends of cylinders 82 and 136, and air is being directed from reversing valve 132 through air line 135, and through flow and check valve 168, with the flow therethrough being unimpeded, into the ends of the cylinders opposite the respective plungers. However, when the plungers 84 and 137 reach the distal ends of movement thereof for movement of valves 100 and 118, respectively, the spool valve member 132a in valve 132 is reversed in the manner set out above, whereupon, while air is being exhausted from the plunger ends of cylinders 82 and 136, and with a reversing valve switched to direct a full flow of air through flow and check valve 136 into the respective plunger ends of cylinders 82 and 136, the outflow of air from these cylinders, from the end opposite the plunger, as well as the plunger 173 in piston positioner cylinder 172, will be discharged out through air lines 141, 142 and 171 into air line 135 and through restrictor valve 168 to control the retraction of the respective plungers 84, 136, and 172. The speed of the plungers can be accurately regulated in accordance with the adjustment of needle valve 168a with respect to the orifice 168b. With these valves so controlling the return of each piston by controlling the escape of air from the respective cylinders, as set forth, an even speed is attained or, if desired, the speed of one or more of the steps of operation may be increased and any one step of the operation may be so regulated so as to perform the function in the desired manner.

It is to be further pointed out that the cylinder block clamp cylinder 109 is a single acting air cylinder, and upon turning the air into the system by opening valve V, the air is immediately directed through air supply line 134 into air line 109b so as to compress spring 109c and clamp the cylinder block 108 in place against movement in any direction. The cylinder block 108 has holes in the lower side thereof to complementally receive dowel pins 111, and as long as the air is impressed on the system the plunger 109a will be extended to clamp the cylinder block 108 in place. However, when it is desired to clean the machine, at the end of the operation, the air valve V is closed, whereupon the air through the various bleeder valves will bleed the air pressure from the system and the spring 109c will retract the plunger 109a, which will enable the pusher rod 16 and head 18 to be removed by withdrawing the plunger rods out through cylinders 32, as will best be seen in FIG. 5; then by disconnecting a union 121 on sausage supply pipe 120 and by removing the piston assembly 22, the lever 88 may be disconnected from plunger 84, then the cylinder block 108 may be lifted from the dowel pins 111, FIG. 2, to enable the cylinder block assembly, including the valve mechanism therein, to be cleaned, inspected, or repaired. After the cylinder block 108 is removed from dowel pins 111, easy access may be had to segmental, oscillating valve 100 to enable the unit to be readily disassembled for cleaning, repair, or inspection. The inverse steps may be taken to reassemble the segmental, oscillating valve 100 into various component parts used in connection with cylinder block 108, preparatory to subsequent sausage molding operations.

The present skinless sausage molding machine is preferably operated with an apparatus for placing sheet material on a surface and cutting to a predetermined length, which places a sheet of paper, film, or the like on the apron 188 in timed sequence with the operation of the sausage molding machine. The air line 134 directs air into air lines 144 and 144d, which lines direct air into friction sleeve valves 145 and 145a, which are actuated by cams moving in co-ordinated relation with the apron 188, so as to place the sheet of paper, film, or the like on the apron, to the desired length, and then, after the molded skinless sausage is ejected thereonto, the paper or film is cut to the desired length, as is fully brought out in our application, filed concurrently.

Having thus clearly shown and described the invention, what is claimed as new and desired to be secured by Letters Patent is:

1. A method of molding skinless sausage, comprising the steps of:
   (a) providing a mold cylinder having an elongated cavity therein,
   (b) bringing two cylinder closure members into abutting relation at atmospheric pressure,
   (c) moving the abutting closure members in the cylinder cavity for a spaced distance, in sealed relation therewithin,
   (d) moving one of the closure members relative to the other of the closure members to form an elongated vacuumized cavity wholly within the cylinder,
   (e) introducing sausage material, under pressure, into the vacuumized cavity in the mold cylinder, intermediate the length thereof,
      (1) creating a positive pressure by continued introduction of sausage material under pressure into the cavity to cause a further elongation of the cavity,
      (2) resiliently retarding the further elongation of the cavity to control the terminal pressure of the sausage in the mold cylinder, thereby controlling the density of the molded sausage, irrespective of the length thereof,
   (f) terminating the introduction of sausage material into the cavity of the mold cylinder, upon filling thereof with sausage material, and
   (g) discharging the molded sausage from the cavity of the mold cylinder.

2. A method of molding moldable material comprising the steps of:
   (a) providing a mold form having a cavity therein,
   (b) bringing two mold form closure members together in abutting relation at atmospheric pressure,
   (c) moving the abutting closure members into a mold form cavity for a spaced distance in sealed relation therewith,
   (d) moving one of the closure members relative to the other of the closure members to form an elongated, vacuumized cavity, wholly within the mold form,
   (e) introducing a moldable material, under pressure, into the vacuumized cavity intermediate the length thereof,
   (f) terminating the introduction of moldable material into the vacuumized cavity of the mold form, upon filling thereof with moldable material, and
   (g) discharging the molded material from the cavity of the mold form.

3. A method of molding moldable material comprising the steps of:
   (a) providing a mold form having a cavity therein,
   (b) bringing two mold form closure members together in abutting relation at atmospheric pressure,
   (c) moving the abutting closure members into a mold form cavity for a spaced distance in sealed relation therewith,
   (d) moving one of the closure members relative to the other of the closure members to form an elongated, vacuumized cavity, wholly within the mold form,
   (e) introducing a moldable material, under pressure, into the vacuumized cavity intermediate the length thereof,
   (f) terminating the introduction of moldable material into the vacuumized cavity of the mold form, upon filling thereof with moldable material,
   (g) further moving one of the closure members relative to the other of the closure members in the mold form longitudinally thereof a predetermined distance to normalize the pressure on the moldable material, and (h) discharging the molded material from the cavity of the mold form.

4. A method of molding skinless sausage; comprising the steps of:
 (a) providing a mold cylinder with an elongated cavity therein,
 (b) providing abutting cylinder closure members extending in abutting relation into the mold cylinder cavity,
 (c) moving the abutting cylinder closure members apart within said cylinder,
 (d) creating a vacuum within said elongated cavity of said mold cylinder between the closure members,
 (e) introducing sausage material, under pressure, into the cavity in which the vacuum is formed,
 (f) terminating the introduction of sausage material into the cavity of the mold cylinder, and
 (g) discharging the molded sausage from the mold cylinder.

5. A method of molding skinless sausage comprising:
 (a) providing a mold cylinder having an elongated mold cavity therein, and cylinder closure members adapted to fit within said elongated cavity in sealed relation therewith,
 (b) bringing the two cylinder closure members into abutting relation exteriorly of the elongated cavity, at atmospheric pressure,
 (c) moving the abutting closure members into the elongated cavity for a spaced distance in sealed relation therewith,
 (d) moving at least one of said closure members relative to the other of the closure members to vacuumize the cavity between the closure members,
 (e) introducing sausage material, under pressure, into the vacuumized cavity,
 (f) terminating the introduction of sausage material into the cavity, when the cavity becomes filled, and
 (g) discharging the molded sausage from the cavity.

6. A method of molding skinless sausage as set out in claim 5, and in addition thereto;
 (a) controlling the molded length of the sausage within the mold cylinder.

7. A method of molding skinless sausage, as set out in claim 5, and in addition thereto;
 (a) adjusting the length and the density of the sausage within the mold cylinder.

8. A method of molding skinless sausage as defined in claim 5; including
 (a) further elongating the mold cavity, within limits, after the termination of introduction of sausage material, to control the expansion of the sausage within the mold cavity, prior to discharge thereof.

9. A method of molding skinless sausage as defined in claim 5, wherein
 (a) pressure is removed from the sausage in the cavity of the mold cylinder by further elongation of the mold cavity prior to discharge.

10. A method of molding skinless sausage comprising:
 (a) providing a mold cylinder having an elongated cavity therein,
 (b) positively sealing the elongated cavity in the mold cylinder with a pair of abutitng, separable seals,
 (c) moving one of the seals relative to the other of the seals to create, between the seals, a vacuumized cavity within the mold cylinder,
 (d) introducing flowable sausage material, under pressure, into the vacuumized cavity,
 (e) terminating the flow of sausage material into the vacuumized cavity into the mold cylinder,
 (f) further moving one of the spaced apart seals relative to the other of the seals within the cavity of the mold cylinder, a predetermined distance, to form a sausage of predetermined length, and to relieve the pressure on the sausage material, and
 (g) further moving the sausage and the spaced apart seals, in fixed spaced apart relation, until one of the seals and the molded sausage, of predetermined length, are discharged from the mold cavity.

11. A method of simultaneously molding a plurality of sausages, comprising:
 (a) providing a plurality of mold cylinders, each having an elongated cavity therein,
 (b) positively sealing the elongated cavity in each mold cylinder with a pair of abutting, separable seals,
 (c) moving one of the seals relative to the other of the seals, in each mold cavity, to create, between the seals, a vacuumized cavity in each mold cylinder,
 (d) simultaneously introducing into each vacuumized mold cavity, flowable sausage material, under pressure,
 (e) simultaneously terminating the flow of sausage material into the vacuumized cavities in the mold cylinders,
 (f) further simultaneously moving, in each mold cavity, one of the seals away from the other of the seals, a predetermined distance, to relative pressure on the sausage material, and
 (g) further moving the sausage and the spaced apart seals, in the cavity within each mold cylinder, in fixed spaced apart relation, until one of the seals and the sausage, of predetermined length, are simultaneously discharged from the mold cavities.

12. A method of molding skinless sausage comprising:
 (a) providing a mold cylinder having a cavity therein and cylinder closure members adapted to fit therein in sealed relation, which closure members are movable relative to each other and movable relative to the mold cylinder,
 (b) bringing the closure members into abutting relation at atmospheric pressure,
 (c) moving the abutting closure members into the mold cylinder a spaced distance,
 (d) moving one of the closure members relative to the other of the closure members to form an elongated vacuumized cavity within the cylinder,
 (e) introducing sausage material, under pressure, into the vacuumized cavity in the cylinder,
  (1) creating a positive pressure in the cavity in the cylinder by continued introduction of sausage material, under pressure, into the cavity to cause further movement of one of the closure members,
  (2) exerting a force in opposition to further movement of the last mentioned closure member to control the terminal pressure on the sausage in the mold cylinder, thereby controlling the density of the molded sausage, irrespective of the length thereof,
 (f) terminating the introduction of sausage material into the cavity of the mold cylinder, upon the filling thereof,
 (g) further moving one of the spaced apart closure members relative to the other closure member, within the cylinder, a predetermined distance longitudinally, to normalize the pressure on the sausage material, and
 (h) discharging the molded sausage from the cavity of the mold cylinder.

13. A method of molding skinless sausage, as defined in claim 12; wherein
 (a) the closure members are brought into abutting relation outside the mold cylinder.

14. A method of molding moldable material comprising:
 (a) providing a mold form which has at least a particylindrical cavity therein to form a mold,
 (b) bringing two mold form closure members together in abutting relation, at atmospheric pressure, which closure members are each complementary in shape to the parti-cylindrical cavity, (c) moving the abutting closure members into the complementary mold form in sealed relation for a spaced distance, (d) moving one of the closure members relative to the other of the closure members within the mold cavity to form an elongated, vacuumized cavity wholly within the parti-cylindrical mold form, (e) introducing moldable material, under pressure, into the vacuumized cavity, (f) terminating the introduction of moldable material into the vacuumized cavity of the mold form, upon filling thereof, (g) discharging the molded material, which is parti-cylindrical in form, from the mold cavity.

15. A method of molding moldable material, as defined in claim 3; wherein (a) the closure members are brought into abutting relation outside of the mold form.

16. A method of molding skinless sausage as defined in claim 4, and including (a) controlling the length of the molded sausage.

17. A method of molding skinless sausage as defined in claim 4 and including:

(a) controlling the density of the molded sausage.

18. A method of molding skinless sausage as defined in claim 4 and including (a) controlling the length and density of the molded sausage.

19. A method of molding skinless sausage as defined in claim 4 and including (a) disengaging the molded sausage from the adjacent closure member.

References Cited by the Examiner
UNITED STATES PATENTS

| | | | |
|---|---|---|---|
| 994,714 | 6/1911 | Boyle | 17—32 |
| 2,683,284 | 7/1954 | Anderson | 17—32 |
| 3,041,153 | 6/1962 | Elder et al. | 31—44 X |
| 3,122,989 | 3/1964 | Clemens et al. | 99—358 |
| 3,199,195 | 8/1965 | De Boer | 31—44 |

LUCIE H. LAUDENSLAGER, *Primary Examiner.*

SAMUEL KOREN, *Examiner.*